US009974101B2

(12) United States Patent
Sekoguchi et al.

(10) Patent No.: US 9,974,101 B2
(45) Date of Patent: May 15, 2018

(54) SERVER FOR TRANSPORT EQUIPMENT

(71) Applicant: Panasonic Intellectual Property Management Co., Ltd., Osaka (JP)

(72) Inventors: Hiroshi Sekoguchi, Osaka (JP); Yoshifumi Asao, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 127 days.

(21) Appl. No.: 15/210,850

(22) Filed: Jul. 14, 2016

(65) Prior Publication Data

US 2017/0055299 A1 Feb. 23, 2017

(30) Foreign Application Priority Data

Aug. 18, 2015 (JP) ................................ 2015-160742

(51) Int. Cl.

*H04W 76/02* (2009.01)
*H04W 4/02* (2018.01)
*H04W 8/00* (2009.01)
*H04W 84/18* (2009.01)

(52) U.S. Cl.

CPC ........... *H04W 76/02* (2013.01); *H04W 4/023* (2013.01); *H04W 8/005* (2013.01); *H04W 84/18* (2013.01)

(58) Field of Classification Search

CPC ..... H04W 76/02; H04W 4/023; H04W 8/005; H04W 84/18

See application file for complete search history.

(56) References Cited

U.S. PATENT DOCUMENTS

| | | | |
|---|---|---|---|
| 5,873,040 | A | 2/1999 | Dunn et al. |
| 2002/0109647 | A1 | 8/2002 | Crandall et al. |
| 2006/0016825 | A1 | 1/2006 | Bauch et al. |
| 2006/0238370 | A1 | 10/2006 | Park et al. |

(Continued)

FOREIGN PATENT DOCUMENTS

| | | |
|---|---|---|
| JP | 10-126843 | 5/1998 |
| JP | 2002-271837 | 9/2002 |

(Continued)

*Primary Examiner* — Jae Y Lee
(74) *Attorney, Agent, or Firm* — McDermott Will & Emery LLP

(57) ABSTRACT

The server is disposed in transport equipment having a plurality of seats and is capable of communicating with at least three radio communication devices and an input/output terminal. The server has a signal-intensity receiver, a storage, and a controller. The signal-intensity receiver receives signal-intensity information on radio waves of an external device. The storage stores first position data indicating a position corresponding to each of the radio communication devices, and second position data indicating a position corresponding to the input/output terminal. The controller receives a connection request for communicating between the radio communication devices and the external device. The controller estimates a position of the external device based on the signal-intensity information and the first position data, determines a connection priority of the external device based on the estimated position and the second position data, and transmits a connectable-device list based on the connection priority to the input/output terminal.

12 Claims, 6 Drawing Sheets

100
1
204A 204B 204C
200A 205A 200B 205B 200C 205C
300A 300B 300C
204D 204E 204F
200D 205D 200E 205E 200F 205F

(56) References Cited

U.S. PATENT DOCUMENTS

| | | | | |
|---|---|---|---|---|
| 2010/0182977 | A1* | 7/2010 | Watanabe | H04N 5/4401 370/331 |
| 2011/0002009 | A1 | 1/2011 | Ohashi | |
| 2014/0085526 | A1 | 3/2014 | Takahashi et al. | |
| 2014/0094143 | A1* | 4/2014 | Ayotte | G06Q 50/18 455/411 |
| 2014/0208370 | A1* | 7/2014 | Hatakeyama | H04N 21/2146 725/76 |
| 2016/0119914 | A1* | 4/2016 | Oizumi | H04W 16/14 370/329 |
| 2016/0227595 | A1* | 8/2016 | Sunagawa | H04W 76/023 |

FOREIGN PATENT DOCUMENTS

| | | |
|---|---|---|
| JP | 2002-359710 | 12/2002 |
| JP | 2009-245027 | 10/2009 |
| JP | 5106759 B | 12/2012 |
| JP | 2013-009205 | 1/2013 |

* cited by examiner

SERVER FOR TRANSPORT EQUIPMENT

BACKGROUND

1. Technical Field

The present disclosure relates to a server for transport equipment such as aircraft and trains.

2. Description of the Related Art

Patent Literature 1 discloses a communication system in which a communication unit disposed on each seat of an airplane communicates with a passenger's terminal device. The communication unit communicates with a passenger's terminal device on Bluetooth (as a registered standard) connection.

CITATION LIST

Patent Literature

PTL 1: Japanese Unexamined Patent Application Publication No. 2002-359710

SUMMARY

The present disclosure provides a server for transport equipment capable of enhancing user-friendliness in network connection between the transport equipment and an external device.

The server is disposed in transport equipment having a plurality of seats and is capable of communicating with at least three radio communication devices and an input/output terminal. The server has a signal-intensity receiver, a storage, and a controller. The signal-intensity receiver receives, from the radio communication devices, signal-intensity information on radio waves of an external device. The storage stores first position data indicating a position corresponding to each of the radio communication devices in the transport equipment, and second position data indicating a position corresponding to the input/output terminal in the transport equipment. The controller receives, from the input/output terminal, a connection request for communicating between one of the radio communication devices and the external device and controls the signal-intensity receiver and the storage. The controller estimates a position of the external device based on the signal-intensity information obtained by the signal-intensity receiver and the first position data read out of the storage, determines a connection priority of the external device based on the estimated position of the external device and the second position data, and transmits a connectable-device list based on the connection priority of the external device to the input/output terminal as a transmission source of the connection request.

The server for transport equipment of the present disclosure enhances user-friendliness in connecting an external device to a network in the transport equipment.

DETAILED DESCRIPTION

Hereinafter, an exemplary embodiment will be described in detail, with reference to the accompanying drawings. However, details beyond necessity—descriptions on well-known matters or on substantially identical structures—may be omitted to eliminate redundancy from the description below for easy understanding of those skilled in the art.

It is to be understood that the accompanying drawings and the description below are for purposes of full understanding of those skilled in the art and are not to be construed as limitation on the scope of the claimed disclosure.

First Exemplary Embodiment

Hereinafter, the structure of the first exemplary embodiment will be described with reference to FIG. 1 through FIG. 6.

[1-1. Structure]

Figure 1:
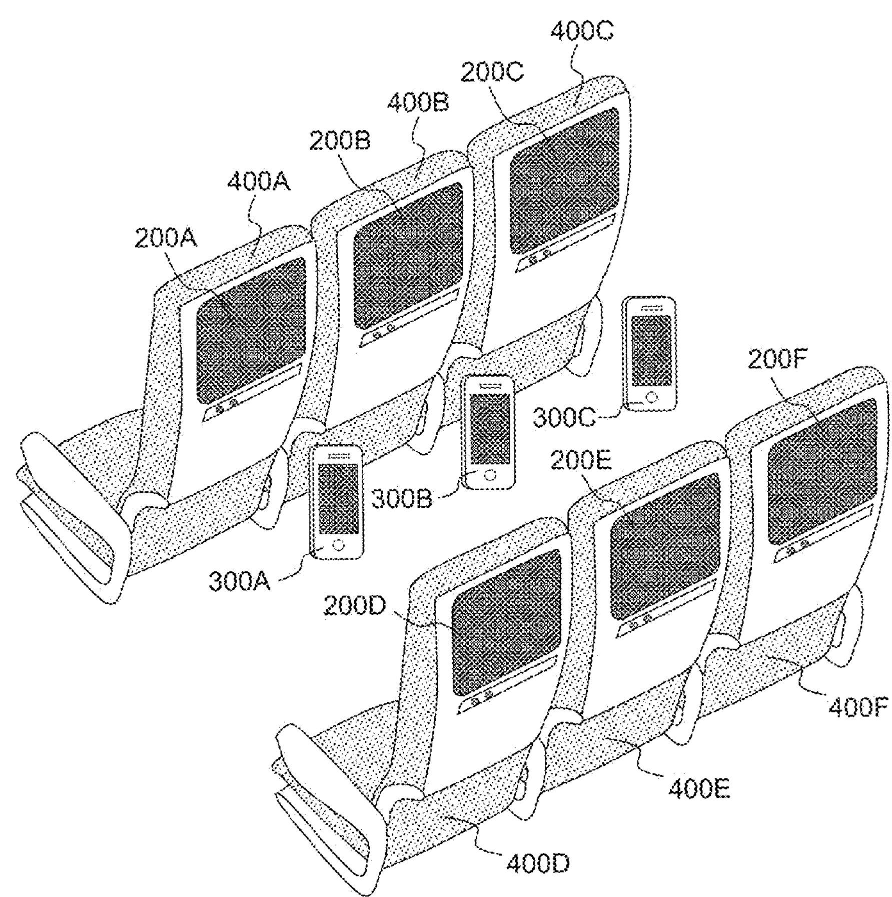
FIG. 1 shows arrangement of on-board monitors disposed in an aircraft in accordance with a first exemplary embodiment.

FIG. 1 shows arrangement of on-board monitors 200A through 200F disposed in an aircraft in accordance with the first exemplary embodiment. The cabin of the aircraft has a plurality of passenger seats 400A through 400F. In the description below, for convenience sake, passenger seats 400A through 400F may collectively be called seat 400. Each of on-board monitors 200A through 200F is disposed on a rear-side position of the backrest of each of passenger seats 400A through 400F. On-board monitors 200A through 200F have a same structure, and they may collectively be called on-board monitor 200 in the description below. Smartphones 300A through 300C of passengers can be connected to on-board monitor 200 via radio waves. Similarly, smartphones 300A through 300C may collectively be called smartphone 300 in the description below.

As shown in FIG. 1, on-board monitor 200 is disposed on the rear side of the backrest of seat 400 at a position that a passenger who sits at right behind can easily view. While sitting in seat 400, passengers can enjoy video-viewing or other on-board services by operating the touch panel (to be described later) of on-board monitor 200 disposed on the backrest of seat 400 in front of each passenger. Besides, passengers can enjoy on-board services via wireless connection between smartphone 300 and on-board monitor 200. An aircraft is an example of the transport equipment.

Figure 2:
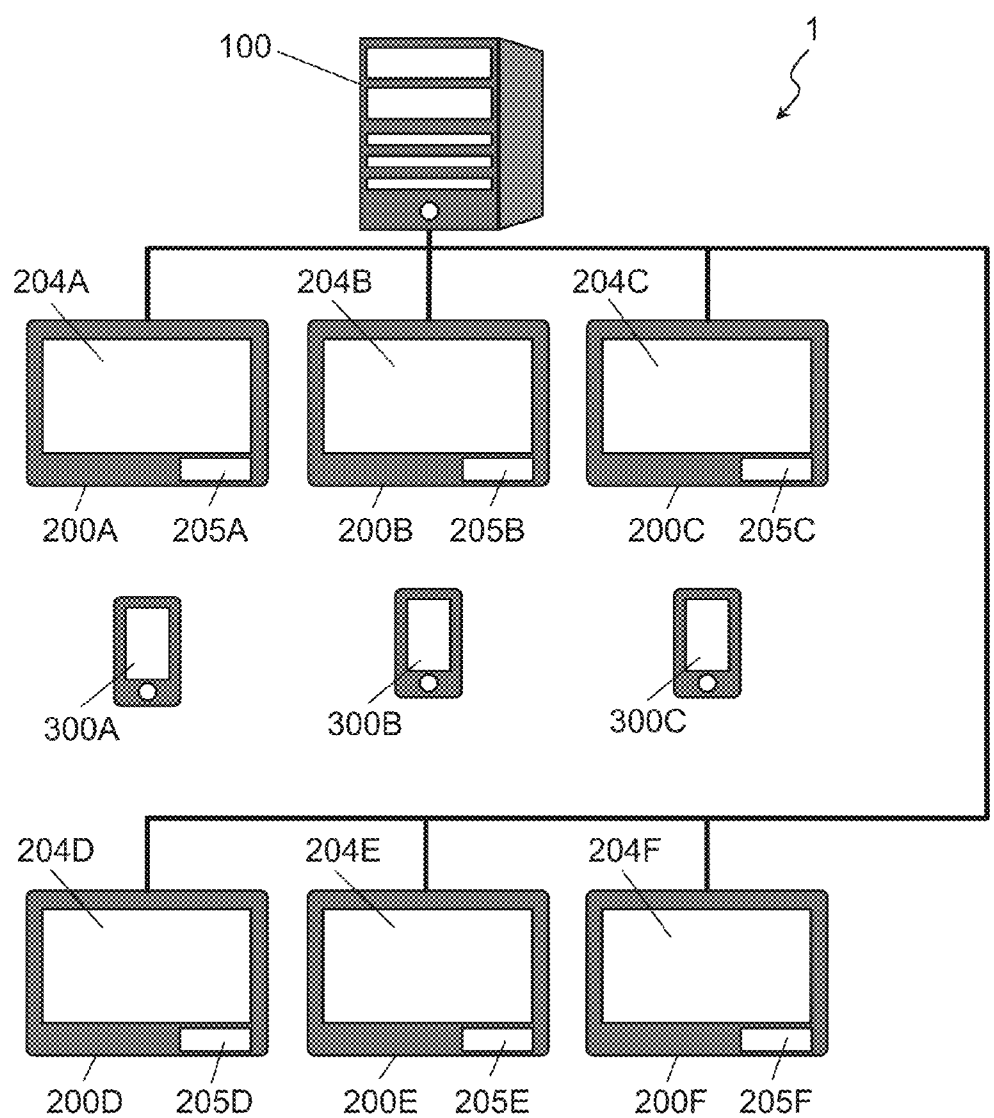
FIG. 2 shows a structure of the radio communications system in accordance with the first exemplary embodiment.

FIG. 2 shows the structure of radio communications system 1. Radio communications system 1 has server 100 and on-board monitor 200 (200A through 200F). Server 100 is connected to on-board monitor 200 via a network cable through which they exchanges data, such as contents distribution and connection states of on-board monitor 200, in the two-way communication. The data on connection states of on-board monitor 200 is under control of server 100.

On-board monitor 200 reproduces contents distributed by server 100 and communicates with an external device such as smartphone 300. On-board monitors 200A through 200F have touch panels 204A through 204F and Bluetooth modules 205A through 205F, respectively. Touch panels 204A through 204F may collectively be called touch panel 204 in the description. Similarly, Bluetooth modules 205A through 205F may collectively be called Bluetooth module 205.

Although the exemplary embodiment describes a structure in which server 100 has connection with six on-board monitors 200, it is merely an example; the number of on-board monitors 200 have no limitation. However, radio communications system 1 needs to have at least three Bluetooth modules 205 to estimate the position of smartphone 300 (to be described later). Further, Bluetooth modules 205 have to be disposed so as not to be on the same straight line. On-board monitor 200 is an input/output terminal. Having Bluetooth module 205, on-board monitor 200 also works as a radio communication device. According to the embodiment, on-board monitor 200 doubles as an input/output terminal and a radio communication device; but the radio communication device may be independent from the input/output terminal in the aircraft, as long as having a Bluetooth module and being capable of communicating with the server.

Having a radio communication module, smartphone 300 establishes two-way radio communications with on-board monitor 200 via Bluetooth module 205. Smartphone 300 is an example of an external device.

Figure 3:
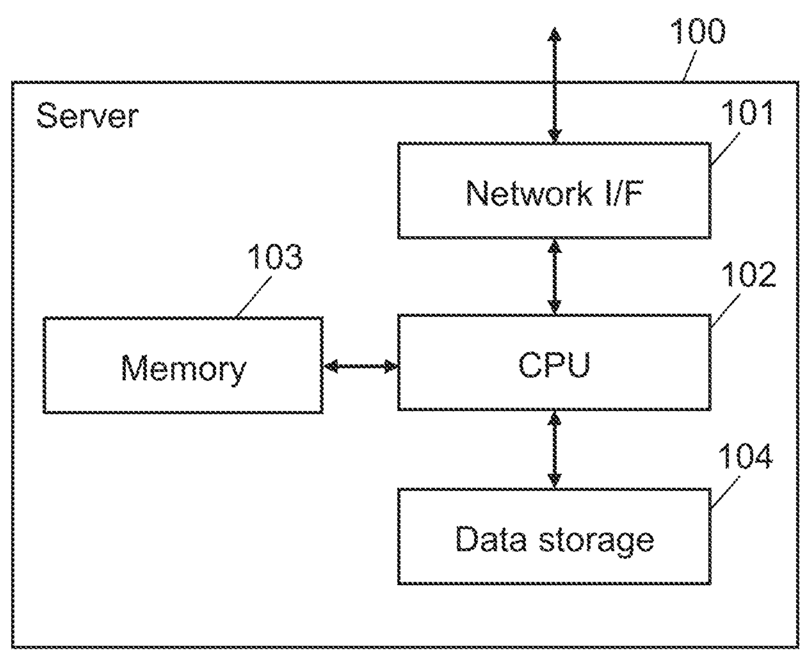
FIG. 3 is a block diagram showing the structure of the server in accordance with the first exemplary embodiment.

FIG. 3 is a block diagram showing the structure of server 100. Server 100 has network interface (I/F) 101, CPU 102, memory 103, and data storage 104. Network interface 101 is an interface through which CPU 102 communicates with on-board monitor 200 via a network cable. Network interface 101 is an example of a signal-intensity receiver that obtains signal-intensity information from on-board monitor 200.

CPU 102 executes programs stored in memory 103 and performs calculations and data processing. CPU 102 reads data from memory 103 and data storage 104 and writes data into them. Besides, CPU 102 communicates with on-board monitor 200 via network interface 101. CPU 102 detects connection request to communicate between an external device and on-board monitor 200 and transmits a search instruction to on-board monitor 200 based on a sequence (to be described later).

Memory 103 stores programs that CPU 102 executes and calculation results obtained by CPU 102. Memory 103 is formed of flash memory and RAM.

Data storage 104 stores contents to be distributed to on-monitor 200, first position data relating to the position of Bluetooth module 205 disposed in on-board monitor 200, and second position data relating to the position (to be described later) of on-board monitor 200. Data storage 104 is an example of a storage device and is formed of a hard disk and flash memory.

The first position data indicates the position of Bluetooth module 205 in the aircraft. In the structure of the exemplary embodiment, Bluetooth module 205 is disposed in on-board monitor 200; the position of Bluetooth module 205 is the same as that of on-board monitor 200. In the embodiment, the data indicating the position of on-board monitor 200 is employed for the first position data. For example, the first position data indicates the seat number of the seat on which on-board monitor 200 is disposed. The second position data indicates the position of a passenger operating on-board monitor 200, that is, the position of the seat in which the passenger sits. The second position data can be represented by a coordinate in a coordinate system with reference to a predetermined position in the aircraft as a point of origin.

Figure 4:
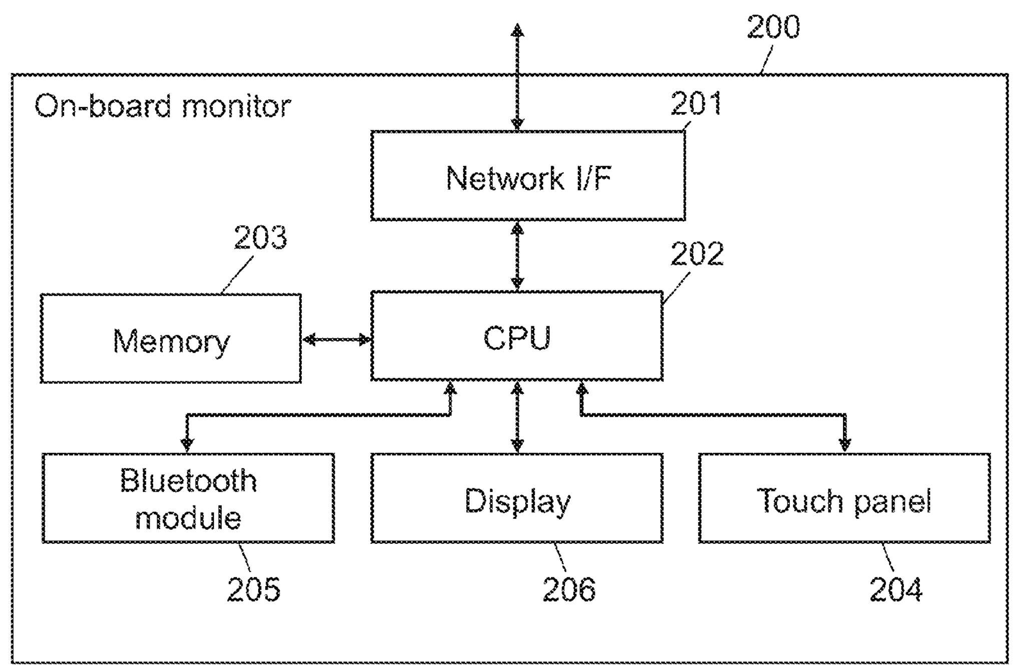
FIG. 4 is a block diagram showing the structure of an on-board monitor in accordance with the first exemplary embodiment.

FIG. 4 is a block diagram showing the structure of on-board monitor 200. On-board monitor 200 has network interface (I/F) 201, CPU 202, memory 203, touch panel 204, Bluetooth module 205, and display 206. Network interface (I/F) 201, CPU 202, memory 203 have hardware structures the same as network interface (I/F) 101, CPU 102, memory 103, respectively, of server 100.

Network interface 201 is an interface through which CPU 202 communicates with server 100 via a network cable. CPU 202 executes programs stored in memory 203 and performs calculations and data processing. CPU 202 reads data from memory 203 and writes data into it. Besides, CPU 202 communicates with server 100 via network interface 201. Memory 203 stores programs that CPU 202 executes and calculation results obtained by CPU 202.

Touch panel 204 is disposed on the surface of display 206. In response to passenger's touching operation onto display 206, touch panel 204 transmits data corresponding to the touched position to CPU 202. Control of CPU 202 based on the data from touch panel 204 allows the passenger to have intuitive operation. Bluetooth module 205 has a controller and an antenna for communication on Bluetooth standards. Receiving instructions from CPU 202, Bluetooth module 205 starts or stops communication, and transmits a communication state with an external device (e.g. smartphone 300) to CPU 202. Display 206 shows contents in response to the instructions from CPU 202. Bluetooth module 205 is disposed at a certain position in on-board monitor 200. On-board monitor 200 is disposed at a certain position of seat 400, for example, on the rear side of the backrest of seat 400. That is, Bluetooth module 205 is two-dimensionally arranged in a plane having a predetermined height from the floor in the aircraft.

[1-2. Workings]

Figure 5:
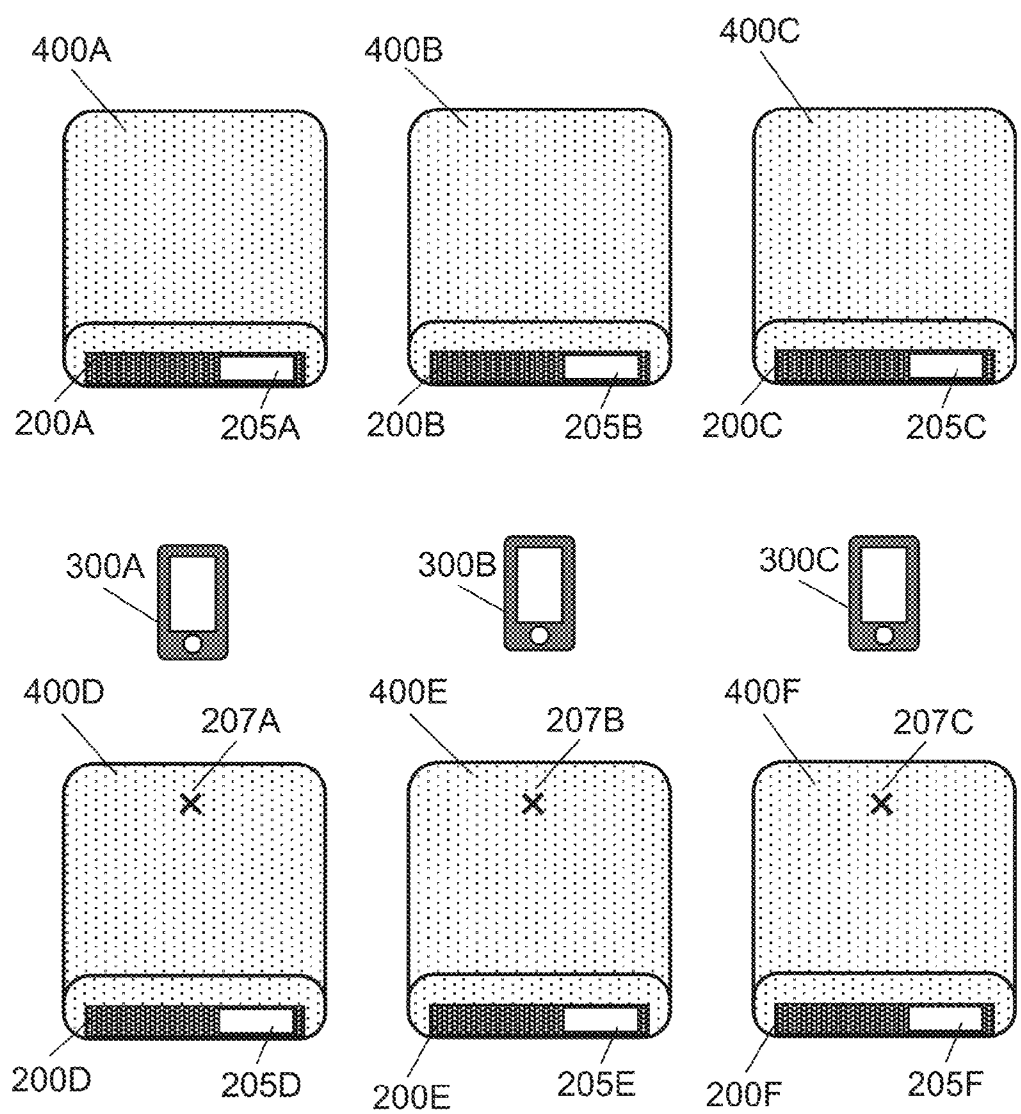
FIG. 5 shows a schematic arrangement of on-board monitors in accordance with the first exemplary embodiment.
Figure 6:
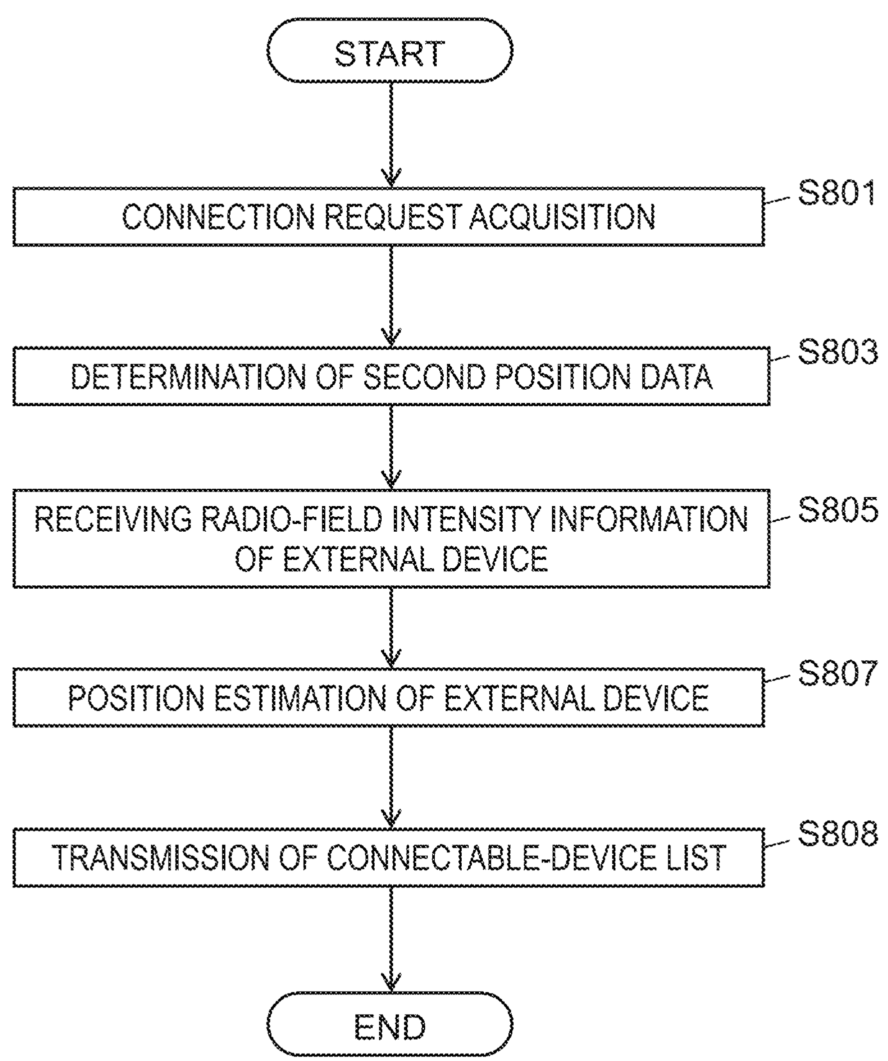
FIG. 6 is a flowchart illustrating the server's operation for transmitting a connectable-device list to an on-board monitor in accordance with the first exemplary embodiment.

The workings of such structured radio communications system 1 will be described below. FIG. 5 shows a schematic arrangement of on-board monitor 200 disposed in the cabin of an aircraft. FIG. 6 is a flowchart illustrating the operation of server 100 for transmitting a connectable-device list to on-board monitor 200.

To establish radio connection between on-board monitor 200 and smartphone 300 of a passenger for enjoying on-board services, the passenger makes a request for connection by operating on-board monitor 200 in front of him/her. In response to the connection request, server 100 searches a wirelessly connectable external device including smartphone 300. Server 100 transmits detected results (i.e., the list of connectable external devices) back to on-board monitor 200 operated by the passenger, and on-board monitor 200 shows the list. When the passenger selects his/her smartphone 300 from the list, radio communication between on-board monitor 200 and smartphone 300 is established via Bluetooth module 205. Hereinafter, the workings of radio communications system 1 will be described with reference to FIG. 6.

[1-2-1 Connection Request Acquisition]

CPU 102 of server 100 monitors whether or not a connection request is entered through touch panel 204 of on-board monitor 200. In response to input of connection request, on-board monitor 200 transmits a connection-request signal to server 100 and CPU 102 acquires it (step S801). When a passenger wants to connect his/her smartphone 300 to the on-board network, the passenger enters connection request by operating touch panel 204 of on-board monitor 200. CPU 202 of on-board monitor 200 detects the operation for the connection request and transmits a connection-request signal to server 100 via network interface 201 for inquiry of connectable devices. On-board monitor 200 retains individual ID in memory 203. CPU 202 transmits its own ID of on-board monitor 200, together with the connection-request signal, to server 100.

The workings in step S801 (FIG. 6) is specifically described below, taking the example shown in FIG. 5. When the passenger sitting in seat 400E (i.e., the passenger facing on-board monitor 200B) wants to connect smartphone 300B to radio communications system 1, the passenger enters connection request by operating on-board monitor 200B (touch panel 204B). Receiving the input, on-board monitor 200B transmits a connection-request signal, together with individual ID '200B' of on-board monitor 200B, to server 100.

CPU 102 of server 100 acquires the connection-request signal from on-board monitor 200 and the connection procedure goes to the next step.

[1-2-2 Determination of Second Position Data]

When receiving a connection-request signal from on-board monitor 200, CPU 102 of server 100 determines the second position data corresponding to on-board monitor 200 as the transmission source of the connection-request signal (step S803). CPU 102 searches data storage 104 for second position data. Based on the individual ID of on-board monitor 200 (received together with the connection-request signal), CPU 102 determines the second position data corresponding to on-board monitor 200 that has transmitted the connection request.

Suppose that on-board monitor 200B in FIG. 5 transmits a connection-request signal to server 100. In response to the signal, CPU 102 determines position 207B as the second position data of on-board monitor 200B. Position 207B is the second position data for on-board monitor 200B; specifically, it represents the position of the passenger who sits toward on-board monitor 200B. Position 207A is the second position data of on-board monitor 200A; similarly, position 207C is the second position data of on-board monitor 200C. Hereinafter, position 207A, position 207B, and position 207C may collectively be called position 207.

[1-2-3 Receiving Radio-Field Intensity Information]

CPU 102 of server 100 receives, from on-board monitor 200, radio-field intensity information that indicates radio-field intensity of an external device (step S805). First, CPU 120 requests on-board monitor 200 to search radio waves of an external device (i.e., smartphone 300). In response to the search request from server 100, CPU 202 of on-board monitor 200 starts to search for an external device in the neighborhood. CPU 202 transmits radio-field intensity information as search results—indicating radio-field intensity of the detected external device received by Bluetooth module 205—to server 100.

In the example shown in FIG. 5, when CPUs 202A through 202F of on-board monitors 200A through 200F detect a plurality of external devices (i.e., smartphones 300A through 300C), the CPUs transmit the radio-field intensity information on all the detected external devices to server 100. For example, Bluetooth module 205B of on-board monitor 200B detects smartphones 300A through 300C and CPU 202B of on-board monitor 200B transmits the radio-field intensity information on smartphones 300A through 300C to server 100. Similarly, on-board monitor 200A, and 200C through 200F transmit radio-field intensity information on the detected external devices (i.e., smartphones 300A through 300C) to server 100.

Receiving the radio-field intensity information transmitted from on-board monitor 200, CPU 102 of server 100 and stores the information into memory 103 or data storage 104.

[1-2-4 Position Estimation of External Devices]

CPU 102 of server 100 estimates the position of the external device, based on the first position data stored in data storage 104 and radio-field intensity information of the external device (smartphone 300) received from CPU 202 of on-board monitor 200 (step S807).

That is, based on the first position information read out from data storage 104, CPU 102 calculates the physical position of Bluetooth module 205 in the aircraft. According to the structure of the embodiment, since Bluetooth module 205 is disposed on on-board monitor 200, the first position data corresponds to a seat number that indicates the position of seat 400 on which on-board monitor 200 is disposed. The seat number has physical position correspondence to seat 400 in the aircraft and is stored in data storage 104, which enables CPU 102 to calculate, based on the first position data, the physical position of Bluetooth module 205 in the aircraft.

CPU 102 estimates the position of an external device by three-point positioning. According to three-point positioning, a target position can be calculated, as long as the distance from three points—they are not on the same straight line and each position of them are known—to the target position on the known plane is obtained. Suppose that the external device is on a specific plane (e.g., on the plane with a height of 70 cm above the floor of the cabin).

The first position data indicates the physical position of Bluetooth module 205 disposed at a fixed position in the aircraft. The radio-field intensity information indicates intensity of radio waves that Bluetooth module 205 receives from an external device; it is the information indicating the distance from Bluetooth module 205 to the external device. That is, as for an external device whose radio-field intensity information can be obtained by three Bluetooth modules 205 that are not disposed on the same straight line, CPU 102 calculates the position of the external device in the aircraft.

In the example of FIG. 5, as described above, CPU 102 of server 100 calculates each position of the external devices (i.e., smartphones 300A through 300C), based on the positions of Bluetooth modules 205A through 205F and radio-field intensity information that Bluetooth modules 205A through 205F, respectively, receive from smartphones 300A through 300C.

[1-2-5 Transmission of Connectable-Device List]

Next, CPU 102 of server 100 transmits a connectable-device list to on-board monitor 200 from which connection request has been transmitted (step S808). To be specific, first, CPU 102 reads out the second position data (position 207) corresponding to on-board monitor 200 (from which connection request has been transmitted) from data storage 104. Next, CPU 102 rearranges the external devices (obtained in step S807) in ascending order in distance position 207, and transmits the list to on-board monitor 200 having passenger's connection request.

In the example shown in FIG. 5, positions 207A through 207C are the positions corresponding seats 400D through 400F for the passengers that operate on-board monitors 200A through 200C, respectively. The passenger who operates on-board monitor 200B is sitting in seat 400E, and therefore, the second position data that indicates position 207B on seat 400E is associated with on-board monitor 200B and stored in data storage 104.

When the passenger sitting in seat 400E makes request to connect between on-board monitor 200B and an external device (i.e., passenger's smartphone 300B), CPU 102 of server 100 prepares the connectable-device list so that smartphones 300A through 300C are sorted in ascending order in distance from position 207B, and transmits the list to on-board monitor 200B. Receiving the connectable-device list, on-board monitor 200B shows it on display 206B. On-board monitor 200B shows the connectable-device list on display 206B as follows: 1. smartphone 300B; 2. smartphone 300C; 3. smartphone 300A. When the passenger selects '1. smartphone 300B' from the list, Bluetooth module 205B of on-board monitor 200B establishes radio connection with smartphone 300B.

When CPU 102 of server 100 receives second-time connection request from on-board monitor 200 after transmitting the connectable-device list to it, CPU 102 transmits again another connectable-device list containing other external devices (not shown in the previous list)—as the next options that follow the external devices in the previous list—arranged at the head of the list.

This allows the passenger to easily select a desired external device.

Further, suppose that CPU 102 of server 100 receives another connection request from on-board monitor 200 under the condition in which radio communication between on-board monitor 200 and an external device has already been established. In that case, CPU 102 determines the connection priority of external devices lower than that of the external device already in communication with on-board monitor 200, and such rearranged connectable-device list to on-board monitor 200. To be specific, this is the case where the passenger wants to additionally connect external devices of a different type from smartphone 300 (such as headphones, a mouse, and a keyboard) while radio communication between on-board monitor 200 and smartphone 300 is being maintained. In the additionally transmitted list, external devices as a connectable candidate other than smartphone 300 are arranged at the head of the list. This allows the passenger to easily select a desired external device.

[1-3 Effects]

According to the embodiment, as described above, server 100 is mounted on an aircraft having a plurality of seats 400, and is capable of communicating three or more on-board monitors 200 having Bluetooth modules 205. Server 100 has network interface 101, data storage 104, and CPU 102.

Network interface 101 obtains radio-field intensity information, which is transmitted from an external device to Bluetooth module 205, from on-board monitor 200. Data storage 104 stores first position data that indicates the position of Bluetooth module 205 in the aircraft, and second position data that indicates the position corresponding to on-board monitor 200 in the aircraft. On-board monitor 200 requests CPU 102 to connect Bluetooth module 205 with an external device. Receiving the connection request, CPU 102 controls network interface 101 and data storage 104. Besides, based on the signal-intensity information obtained by network interface 101 and the first position data read out of data storage 104, CPU 102 estimates the position of an external device. Further, based on the estimated position of the external device and the second position data, CPU 102 determines a connection priority of connectable external devices and transmits a connectable-device list based on the connection priority back to on-board monitor 200 as the transmission source of the connection request.

When a passenger requests to connect Bluetooth-compatible smartphone 300 with on-board monitor 200, sever 100 forms a connectable-device list where connectable candidates are arranged in order of priority and transmits the list to on-board monitor 200. This allows the passenger to easily select desirable smartphone 300. That is, radio communications system 1 effectively enhances user-friendliness in establishing connection between smartphone 300 and the network in the aircraft.

Other Exemplary Embodiments

The structure described in the aforementioned embodiment is merely an example of the technique of the present disclosure. That is, the technique of the present disclosure is not limited to the structure described above but is applicable to exemplary embodiments with various changes and modifications. Further, a combination of the components described in the exemplary embodiment above may form another structure other than the example described above. Hereinafter, other exemplary embodiments will be described.

The aforementioned exemplary embodiment shows a radio communications system in an aircraft as an example, but it may be a radio communications system used in other transport equipment, such as Shinkansen (bullet train) and a bus.

CPU 102 of server 100 in the aforementioned exemplary embodiment determines the correction priority of external devices so as to be arranged in an ascending order in distance from position 207; but the correction priority may be determined taking, for example, the arrangement of seat 400 into account. That is, correction priority may be performed on external devices disposed in a certain direction with respect to on-board monitor 200 as the transmission source of connection request. For example, the connection priority of an external device disposed opposite to the display direction of display 206 may be determined lower than that of other external devices. Similarly, this may be applicable to an external device disposed distant from on-board monitor 200 as a transmission source; when the distance between the external device and on-board monitor 200 is greater than the distance between the seats in the front-back direction of seat 400, the connection priority of the external device may be determined lower than that of other external devices. Such a distantly-positioned external device has a high probability of being eliminated from the connectable candidates.

According to the aforementioned embodiment, Bluetooth module 205 is contained in on-board monitor 200 and disposed on a two-dimensional plane, so that the connection priority of the external devices as the connectable candidates is determined in the connectable-device list based on the planar distance from position 207 associated with on-board monitor 200. As another possibility, taking information on height direction into account, the position estimation of external devices may be carried. In that case, Bluetooth module 205 has three-dimensional arrangement so that the connection priority of connectable candidates is determined, taking the position of an external device in the height direction into account. In the structure above, any given position in a three-dimensional space can be calculated with use of signal-intensity information fed from four or more Bluetooth modules 205.

Further, when the position of an external device is three-dimensionally estimated, the connection priority may be corrected with reference to information on position in the height direction. For example, as for external devices positioned at a place in the upward direction (e.g., on the baggage rack) and at a place in the downward direction (e.g., under the seat), the connection priority of them can be determined lower in the connectable candidates. In contrast, as for external devices positioned at a height corresponding to the passenger's head (e.g., headphones), the connection priority of them can be determined higher in the connectable candidates so as to be easily selected from the list and connected to Bluetooth module 205.

In particular, when an application is running on-board monitor 200, the connection priority of an external device positioned at a certain place may be corrected according to the type of application. For example, suppose that on-board monitor 200 is carrying out an application in which an external device wearable to the head such as headphones can be used. In that case, an external device positioned at a place about the same as the head height of a passenger in the seat in the vertical direction of position 207 corresponding to the position of on-board monitor 200 can be ranked higher in the connectable-device list. Similarly, when on-board monitor 200 is carrying out an application in which the passenger can use a personal device such as smartphone 300, an external device positioned at about the same as the hands position of a sitting passenger in the vertical direction of position 207 corresponding to the position of on-board monitor 200 can be ranked higher in the connectable-device list.

The structure described in the aforementioned embodiment employs a network cable (i.e., wired connection) to connect between server 100 and on-board monitor 200. Using a network cable is effective in stabilizing the connection between server 100 and on-board monitor 200. However, the connecting method is not limited thereto; wireless communication or combination of wired and wireless communication increases degree of freedom in arrangement of on-board monitor 200. For example, server 100 may be disposed outside the transport equipment.

CPU 102 of server 100 described in the aforementioned embodiment calculates the physical position of Bluetooth module 205 in the aircraft, based on the first position data, but it is not limited thereto; CPU 102 may calculates the physical position with reference to a table stored in data storage 104 or memory 103, using the first position data as the key.

In the structure described in the aforementioned embodiment, the first position data, which is stored into data storage 104 by server 100, indicates the seat number of seat 400 on which on-board monitor 200 having Bluetooth module 205 is disposed. In the structure where on-board monitor 200 is disposed so as to correspond to arrangement of seat 400, employing the seat number for the first position data contributes to reduction of amount of information. However, the first position data is not limited to the seat number; it may indicate the physical position in the aircraft of on-board monitor 200 having Bluetooth module 205. For example, suppose that a value of coordinates on a coordinate system defined in the aircraft is stored as the position data of Bluetooth module 205 into the data storage. In that case, the position of an external device can be estimated even when on-board monitor 200 is not regularly arranged.

According to the aforementioned embodiment, in response to inquiry (in the form of a connection-request signal) about connectable candidates transmitted from on-board monitor 200, CPU 102 of server 100 determines the second position data, receives radio-field intensity information, estimates the position of an external device, and prepares the connectable-device list and then sends it to on-board monitor 200. What server 100 needs to do in response to inquiries from on-board monitor 200 is sending the connectable-device list back to on-board monitor 200 as a transmission source. That is, all of or a part of the aforementioned server's jobs—determining the second position data; receiving radio-field intensity information; estimating the position of an external device; and preparing the connectable-device list—can be performed with no regard to the timing of receiving inquiries. For example, they may be performed before receiving inquiries or may be performed on a regular basis.

Touch panel 204 described in the aforementioned embodiment is an example of the input section through which a passenger makes connection request. The input section is not limited to a touch panel, as long as it allows a passenger to enter request for connection between smartphone 300 and on-board monitor 200. For example, NFC (Near Field Communication) may be employed for the input section for making connection request.

The aforementioned embodiment described an example where on-board monitor 200 has radio communication with smartphone 300. The external device having radio communication with on-board monitor 200 is not limited to smartphone 300; the device on the other end of the communication may be headphones, a notebook computer, a tablet terminal, and a head mounted display.

According to the aforementioned embodiment, display 206 of on-board monitor 200 shows all the detected external devices in a connectable-device list as follows: '1. smartphone 300B; 2. smartphone 300C; 3. smartphone 300A'. Display 206 may show a device of the highest rank.

The structure of the embodiment has been described in detail as an example of the technology of the present disclosure with reference to accompanying drawings.

In addition to a component essential for solving problems, the accompanying drawings and the in-detail description can contain a component used for illustrative purpose in the technology but not essential for solving problems. It will be understood that not all the components described in the drawings and description are essential for solving problems.

Further, it will be understood that the aforementioned embodiment is merely an example of the technique of the present disclosure. That is, the technique of the present disclosure is not limited to the structure described above, allowing modification, replacement, addition, and omission without departing from the spirit and scope of the claimed disclosure.

INDUSTRIAL APPLICABILITY

The server for transport equipment of the present disclosure enhances user-friendliness in connecting an external device to a network in the transport equipment. The server is applicable to a radio communications system in transport equipment such as aircraft and trains.

What is claimed is:

1. A server that is disposed in transport equipment having a plurality of seats and is capable of communicating with at least three radio communication devices and an input/output terminal, the server comprising:

a signal-intensity receiver that receives, from the radio communication devices, signal-intensity information on radio waves of an external device:

a storage that stores first position data indicating a position corresponding to each of the radio communication devices in the transport equipment, and second position data indicating a position corresponding to the input/output terminal in the transport equipment; and a controller that receives, from the input/output terminal, a connection request for communicating between one of the radio communication devices and the external device and controls the signal-intensity receiver and the storage, wherein, the controller estimates a position of the external device based on the signal-intensity information obtained by the signal-intensity receiver and the first position data read out of the storage;

determines a connection priority of the external device based on the estimated position of the external device and the second position data; and transmits a connectable-device list based on the connection priority of the external device to the input/output terminal as a transmission source of the connection request.

2. The server of claim 1, wherein the controller determines the connection priority so that the external device disposed in a certain direction with respect to the input/output terminal as the transmission source of the connection request is ranked lower.

3. The server of claim 2, wherein the certain direction is a direction opposite to a display direction of a display of the input/output terminal as the transmission source of the connection request.

4. The server of claim 2, wherein the certain direction is an upward direction with respect to the input/output terminal as the transmission source of the connection request.

5. The server of claim 2, wherein the certain direction is a downward direction with respect to the input/output terminal as the transmission source of the connection request.

6. The server of claim 1, wherein when a distance between the external device and the input/output terminal as the transmission source of the connection request is greater than a predetermined amount, the connection priority of the external device is determined to be lower.

7. The server of claim 1, wherein when a distance between the external device and the input/output terminal as the transmission source of the connection request is greater than a distance between the seats in a front-back direction, the connection priority of the external device is determined to be lower.

8. The server of claim 1, wherein the connection priority is corrected on the external device positioned at a certain place according to an application running on the input/output terminal as the transmission source of the connection request.

9. The server of claim 8, wherein the external device of a head-worn type can be used in the application, and when the external device is located at a position corresponding to a seat facing the input/output terminal as the transmission source of the connection request and is located at a height included in a predetermined range in a vertical direction, the connection priority of the external device is determined to be higher.

10. The server of claim 8, wherein the external device of an in-hand manipulation type can be used in the application, and when the external device is located at a position corresponding to a seat facing the input/output terminal as the transmission source of the connection request and is located at a height included in a predetermined range in a vertical direction, the connection priority of the external device is determined to be higher.

11. The server of claim 1, wherein when the controller receives the connection request again from the input/output terminal after transmitting the connectable-device list to the input/output terminal, the controller determines the connection priority of the external device contained in the previously transmitted connectable-device list to be lower.

12. The server of claim 1, wherein when the controller receives the connection request again from the input/output terminal under a condition in which the communicating between one of the radio communication devices and the external device has already been established, the controller determines the connection priority of the external device of a type similar to the external device in the communicating to be lower.

* * * * *